United States Patent [19]

Orme et al.

[11] Patent Number: 5,697,636
[45] Date of Patent: Dec. 16, 1997

[54] FLAT-SEWN AIRBAG CUSHION ATTACHMENT AND METHOD OF MAKING THE SAME

[75] Inventors: Bradley L. Orme, North Ogden; Todd J. Roe, Pleasant View, both of Utah

[73] Assignee: Morton International, Inc., Chicago, Ill.

[21] Appl. No.: 611,229

[22] Filed: Mar. 5, 1996

[51] Int. Cl.⁶ .................................................... B06R 21/16
[52] U.S. Cl. .............................. 280/728.2; 280/743.1
[58] Field of Search .......................... 280/728.2, 732, 280/743.1

[56] References Cited

U.S. PATENT DOCUMENTS

| | | | |
|---|---|---|---|
| 5,090,729 | 2/1992 | Watanabe | 280/743.1 |
| 5,421,607 | 6/1995 | Gordon | 280/728.2 |
| 5,454,588 | 10/1995 | Rose | 280/728.2 |
| 5,549,326 | 8/1996 | Ramos | 280/743.1 |

*Primary Examiner*—Kenneth R. Rice
*Attorney, Agent, or Firm*—Taylor J. Ross; Gerald K. White

[57] ABSTRACT

A an airbag cushion attachment section which may be assembled in the flat condition, and a method of assembling same. The attachment section takes the form of a tubular section having longitudinal ends. One end is attached to the cushion main body. The other end includes fabric loop portions which may be used to secure the cushion to a housing using rods. The tubular mounting section is formed by two fabric pieces, each forming 180° of the tubular mounting section. The two fabric pieces may each have the fabric loops folded over and sewn while the fabric pieces are flat. Thereafter, the two fabric pieces are laid one upon the other, and the lateral edges sewn together while still in the flat condition. The fabric pieces may then be spread apart into the tubular form for assembly to the cushion main body. The sewing in the flat condition permits automated assembly of the attachment section.

12 Claims, 1 Drawing Sheet

FLAT-SEWN AIRBAG CUSHION ATTACHMENT AND METHOD OF MAKING THE SAME

CROSS-REFERENCE TO RELATED INVENTIONS

This application is related to pending U.S. Ser. No. 08/529,268, to Lewis et al., filed Sep. 15, 1995, which is incorporated by reference herein and made a part hereof, including but not limited to those portions which specifically appear hereinafter.

BACKGROUND OF THE INVENTION

1. Field of the Invention

The present invention relates in general to airbag cushion attachment sections, and methods of making same. In particular, the present invention relates to an improved attachment section between an airbag cushion and a housing, which may be sewn in a flat condition, and a method of making same.

2. Description of the Related Art

Airbag passive restraint systems typically include an inflator for producing a quantity of gas, and a cushion which is inflated by the gas. The inflator and cushion are typically assembled together into a single unit, commonly known as an airbag module. Such a module is then installed in the dashboard, etc., of a vehicle.

Since the cushion must inflate very rapidly (on the order of 10 milliseconds) to be effective during a collision, the inflator produces the gas very quickly. This rush of gas into the cushion creates large forces which tend to blow the cushion away from the inflator. As such, it is necessary to connect the cushion securely to the inflator.

Numerous arrangements are known for connecting cushions to inflators. These of course vary depending upon the shape of the cushion and the shape of the inflator. The present invention is concerned typically with airbag modules used for protection on the passenger side of the vehicle. In these modules, the inflator and cushion are commonly stored in a housing having a generally concave form. The opening or mouth of the housing initially stores the folded cushion, and the cushion expands outward from this mouth upon inflation.

In such modules it has been known to attach the cushion to the inflator via the housing. In particular, the cushion includes an attachment section having an inlet opening which mates with the mouth of the housing. Two sides of the inlet opening of the cushion include fabric loops, and two sides of the housing include semi-cylindrical grooves. The fabric loops are inserted into the grooves, and a rod is then inserted into each fabric loop, within the groove. The rod has a diameter greater than the inlet to the groove, and as such the fabric loop is secured to the groove. In this manner the cushion is secured to the housing.

While this arrangement provides a secure attachment, it has drawbacks. In particular, to mate with the housing and provide the two sides with the fabric loops, the inlet opening takes the general form of a tube having a longitudinal axis extending outward from the mouth of the housing. This tubular shape is typically too small for protection of the passenger, and as such the tubular inlet opening is formed with a short length, and its outer end is secured to the main body of the cushion. To form the tubular inlet opening/attachment section, a strip of fabric was formed into a tubular loop, and the overlapping edges sewed together. This has required skilled manual labor to manipulate the fabric into the proper position during sewing, increasing the cost of the cushion, airbag module, and ultimately the vehicle.

SUMMARY OF THE INVENTION

An object of the present invention is to provide a mounting section for an airbag cushion which will securely retain the cushion to a housing.

Another object of the present invention is to provide such a mounting section which may be assembled in the flat condition, permitting automation of the sewing process.

Yet another object of the present invention is to provide a method of forming such a mounting section.

These and other objects are achieved by an airbag cushion attachment section which may be assembled in the flat condition, and a method of assembling same. The attachment section takes the form of a tubular section having longitudinal ends. One end is attached to the cushion main body. The other end includes fabric loop portions which may be used to secure the cushion to a housing using rods. The tubular mounting section is formed by two fabric pieces, each forming 180° of the tubular mounting section. The two fabric pieces may each have the fabric loops folded over and sewn while the fabric pieces are flat. Thereafter, the two fabric pieces are laid one upon the other, and the lateral edges sewn together while still in the flat condition. The fabric pieces may then be spread apart into the tubular form for assembly to the cushion main body. The sewing in the flat condition permits automated assembly of the attachment section.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
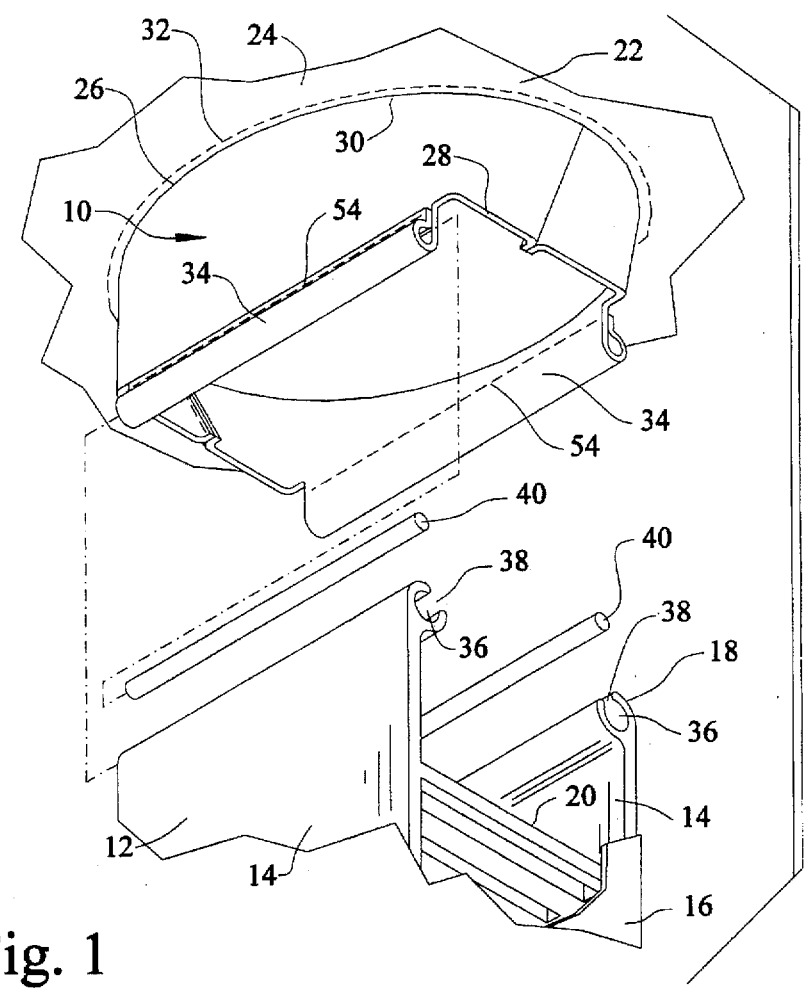
FIG. 1 is a perspective exploded view of a cushion and housing showing the assembled cushion attachment according to the present invention.

With reference to FIG. 1, an airbag cushion attachment section according to the present invention is generally designated by reference numeral 10. Before describing the attachment 10 in detail, the environment in which it is used will first be discussed.

As shown, the section 10 is employed with an airbag housing 12. The housing is a concave member having two spaced side walls 14, a connecting bottom wall (not shown) extending between the lower ends of the side walls, and a pair of end walls 16. The housing is preferably formed by extruding the side and bottom walls as a monolithic unit, and then attaching the end walls by appropriate fasteners. Other methods, such as bending sheet metals, may of course be employed.

The various walls of the housing define a generally concave form having an interior and an open mouth edge 18 providing access to the interior. Within this interior there will be mounted an inflator (not shown) for producing a quantity of inflation gas upon receipt of a signal from a controller (not shown). To aid in dispersing this gas, the housing may include a diffuser 20 located between the inflator and the mouth edge 18. The portion of the interior above the diffuser, or at least just inside the mouth edge, will typically be used to store a cushion 22 in the folded state.

In FIG. 1 the cushion 22 is shown in the inflated condition. The cushion will include a main body 24, which may take various shapes as dictated by the needs of passenger safety, and which is formed by a flexible fabric. The main body will include an attachment opening 26. While the opening 26 has been shown as circular, other shapes such as elliptical, rectangular, etc., may be employed.

The attachment section 10 is mounted between the cushion main body 24 and the housing 12. In particular, the attachment section 10 has a generally tubular form, and is formed of flexible fabric, preferably of the same type used for the main body 24. The attachment section includes inner and outer longitudinal ends 28 and 30. The outer longitudinal end has a peripheral length approximating that of the attachment opening 26, and is secured to the main body about the attachment opening. This may be achieved by adhesives, heat bonding, etc., but preferably includes one or more lines of stitching 32. As noted, the attachment section 10 is formed of flexible fabric, and as such the generally tubular form of the attachment may readily conform to the various shapes which the attachment opening may take.

The inner longitudinal end of the attachment section 10 is secured to the housing. The inner end 28 will mate with the housing such that the inner end will extend about the interior of the housing. To ensure that the majority of inflation gas flows into the attachment section, rather than between the attachment section and end wall for example, the inner end has a peripheral length approximating the peripheral length about the housing interior, at the location at which the inner end is mounted. In other words, the inner end will closely conform to the interior of the housing.

Figure 2:
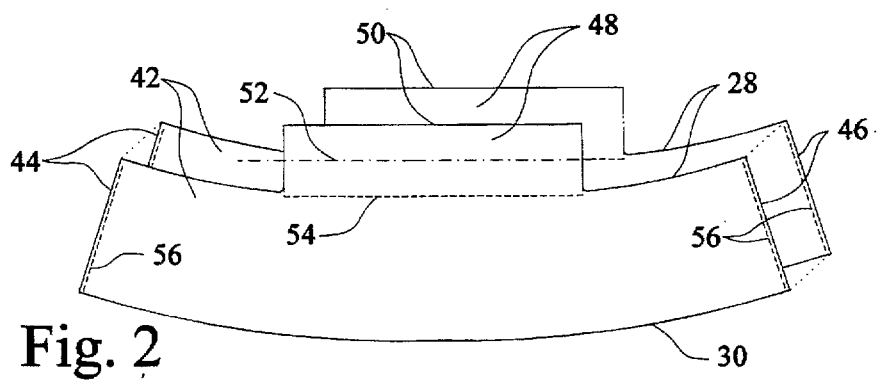
FIG. 2 is a plan view of an unassembled cushion attachment sheet according to a first embodiment of the present invention.

To secure the inner end to the housing, the inner end 28 is provided with at least two rod loops 34. In the embodiment of FIGS. 1 and 2, the rod loops are divided into two sets, with each set contains a single rod loop 34. The housing 12 also includes a number of rod grooves 36, with the number of grooves corresponding to the number of rod loop sets. The sets of rod loops are positioned upon the periphery of the inner end 28 such that each set of the rod loops will be adjacent an associated one (or set of) rod grooves 36. In the embodiment shown, there are two rod grooves, one on each side wall 14. As may be seen, the loops 34 are positioned to be aligned with the grooves. The grooves 36 include openings 38 providing access to the interior of the groove. The openings 38 are restricted compared to the interior. In other words, the groove may be formed as a semi-circle, and the opening has an angular extent of less then 180°.

It is noted that the formation of the grooves on the side walls is easily achieved using the preferred extruded side walls. It is also possible, however, for the end walls 16 or bent sheet metal side walls to be provided with grooves 36. Further, while the grooves 36 have been shown at the mouth edge 18 of the housing for clarity, the grooves would typically be located further within the interior of the housing, such as adjacent the diffuser 20.

The final component for connection of the attachment section to the housing is a plurality of rods 40. The rod loops 34 are sized to receive the rods 40. Further, the rod grooves 36 are sized to receive the rod loops 34 with the rods 40 received therein. In particular, the diameter of the grooves will accept the loops and rods. The openings 38, however, are smaller than at least the combined rod and loop, and preferably are smaller than the diameter of rods 40.

In this manner, the combined rod and loop will be retained in the groove against movement out through the mouth edge 18. This of course also requires a special mounting procedure. Specifically, the rod loop(s) 34 are inserted into the opening of the associated groove 36 prior to insertion of the rod. Thereafter, the rod is slid into the groove and rod loop. Alternatively, the combined rod and loop may both be slid into the associated groove. This procedure requires that the grooves have an open end which is accessible, such as prior to mounting the end walls in the embodiment shown.

With the general environment thus described, the inventive attachment section, and method of forming same, will now be described.

As may be seen in FIG. 1, the attachment section, while having the general tubular form, is composed of two separate attachment pieces 42. As is best shown in FIG. 2, each piece 42 is an elongated member having the inner and outer longitudinal ends 28 and 30, and first and second lateral ends 44 and 46, respectively. Depending upon the shape of the mouth edge 18 and attachment opening 26, each piece 42 may be essentially rectangular, or may have curved portions, as shown. Each individual piece may also be formed of a single, or multiple layers of fabric, as strength requires.

The inner end 28 of each piece 42 will have one or more loop projections 48 extending outward therefrom to a free end 50. The loop projections will be used to form the rod loops 34. In particular, for each piece 42 the loop projections will be folded back upon themselves along a predetermined fold line 52. Thereafter, the free end 50 will be secured to the remainder of the piece. As before, this may be by adhesives, heat bonding, etc., although sewing is preferred, as along a sew line 54. This procedure is repeated for all loop projections, and for the projections on the other piece 42. In this manner it may be seen that the rod loops 34 are formed.

Thereafter, the two pieces 42 are laid one upon the other. As illustrated in FIG. 2, the pieces are formed such that the distance between the lateral ends 44 and 46 is approximately identical. In other words, each of the pieces 42 will form one-half (180°) of the completed tubular attachment section 10.

As such, when the two pieces 42 are laid upon each other in a flat condition, the first and second lateral ends will be in overlying relation. Typically, the inner and outer longitudinal ends 28 and 30 will also be in overlying relation also, but this may vary depending upon the final desired form of the attachment section (and more particularly whether it extends directly out from the housing, or at an angle). The respective lateral ends are then joined to each other (i.e., first end to first end and second end to second end) along longitudinal lines adjacent the lateral ends. The attachment options noted above are again available, although a sew line 56 is again preferred.

As may be envisioned, the two pieces 42 are thus joined only at their lateral ends, and the central portions between the lateral ends may be pulled away from each other. With the lateral ends secured, this causes the attachment section to take the generally tubular form, as illustrated in FIG. 1. The tubular form may then be inverted (i.e., turned insideout), if desired, to cause the sew lines 56 to be on the interior of the tube, as shown in FIG. 1. At this point the outer longitudinal ends 30 may be positioned on (or under) the main body about the attachment opening 26, and secured. Again, sewing along the line 32 is the preferred attachment method. At this point the cushion 22 is completed (assuming all other cushion forming steps are completed). The only remaining steps are to attach the cushion to the housing by the method described above.

As may be seen, the present attachment section, by the use of two pieces having substantially identical lengths between lateral ends, permits the pieces to be secured together while in a flat, overlying condition. Further, no manipulation of the relative positions of the pieces is required between joining one lateral end and the other, and the overlying relation is simply maintained during both joining operations. This greatly simplifies the assembly of the attachment section, and permits automated assembly.

It is noted that the joining of the free end of the loop projection to the body of the piece would require complex manipulation of the pieces, if performed after the pieces are joined together. However, by simply performing the joining step for the loop projections prior to joining the two pieces 42, this is avoided. Further, the joining of the loop projections is another operation which may be performed in the flat condition (after the folding step), and thus automated.

In this manner the attachment section according to the present invention simplifies the assembly process, reducing cost. Further, the use of substantially identical pairs of pieces means that the original sheet of fabric from which the pieces 42 are cut may be well utilized, in that the maximum number of pieces may be cut from a given area.

Figure 3:
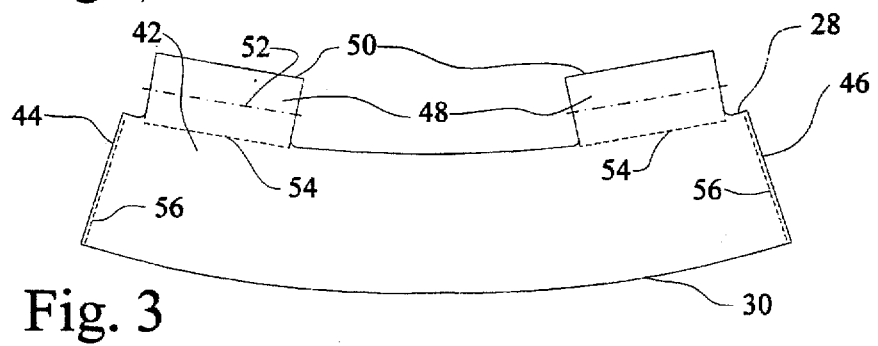
FIG. 3 is a plan view of an unassembled cushion attachment sheet according to a second embodiment of the present invention.

The attachment section described above may of course be varied for a particular housing, etc., so long as the two pieces with the same lateral length are used. Variations in the particular size and shape of the pieces, including the number, size and location of loop projections, is anticipated. Further, the particular location for the lateral ends in the circumferential direction may be varied. This is illustrated in FIG. 3, where a second embodiment of a piece is designated by 42'.

In this second embodiment, the lateral ends are located within the extent of the rod loops, rather than between the loops as in FIG. 1. For this embodiment the two single loops are each split into two loops, such that each set of loops would contain two loops. This embodiment would be assembled in an identical manner, and would operate the same as the first embodiment, with the sole exception that the seam between pieces 42' would be rotated 90° compared to the seam between pieces 42 in FIG. 1.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. In an airbag cushion having a main body with an attachment opening, and an attachment section for connecting the main body to an inflator, the improvement comprising:

said attachment section taking the general form of a tube having inner and outer longitudinal ends, said inner end constructed and arranged to be connected to said inflator, and said outer end sized to be secured to said attachment opening, said attachment section being formed of two pieces joined together at lateral ends thereof, said lateral ends being located approximately 180° apart in a circumferential direction about the general tube form.

2. The improvement of claim 1, wherein said outer longitudinal end includes a plurality of rod loops extending therefrom.

3. The improvement of claim 2, wherein said lateral ends are located between adjacent ones of said rod loops.

4. In an air bag module having a housing, a cushion with a main body and an attachment opening, and an attachment section extending between and connecting said housing and said cushion main body, the improvement comprising:

said attachment section taking the general form of a tube having inner and outer longitudinal ends, said inner end constructed and arranged to be connected to said inflator, and said outer end secured to said attachment opening, said attachment section being formed of two pieces joined together at lateral ends thereof, said lateral ends being located approximately 180° apart in a circumfrential direction about the general tube form.

5. The improvement of claim 4, wherein said outer longitudinal end includes a plurality of rod loops extending therefrom.

6. The improvement of claim 5, wherein said lateral ends are located between adjacent ones of said rod loops.

7. In an airbag cushion having a main body with an attachment opening, and an attachment section for connecting the main body to an inflator, the improvement comprising:

said attachment section taking the general form of a tube having inner and outer longitudinal ends, said inner end constructed and arranged to be connected to said inflator, and said outer end sized to be secured to said attachment opening, said attachment section being formed of two pieces, each having said inner and outer ends, and each further including first and second lateral ends, said first lateral ends of said pieces being joined together, and said second lateral ends of said pieces being joined together, the distance between said first and second lateral ends being approximately identical for said first and second pieces.

8. The improvement of claim 7, wherein said outer longitudinal end includes a plurality of rod loops extending therefrom.

9. The improvement of claim 8, wherein said lateral ends are located between adjacent ones of said rod loops.

10. A method of providing an attachment section for an airbag cushion having a main body with an attachment opening, said attachment section taking a generally tubular form having inner and outer longitudinal ends, comprising the steps of:

providing two pieces, each of said pieces having said inner and outer longitudinal ends, and first and second lateral ends, the distance between said lateral ends being approximately identical for both of said pieces, said inner end being constructed and arranged to be connected to an inflator, and said outer end being constructed and arranged to be secured to said attachment opening;

placing said two pieces in overlying relation with said first lateral ends overlying, and said second lateral ends overlying;

securing said first lateral ends together, and securing said second lateral ends together;

spreading said pieces apart between said lateral ends to form said generally tubular form, and;

securing said inner longitudinal end to said attachment opening.

11. A method as in claim 10, wherein said providing step further includes each of said pieces further including a loop projection extending from said inner longitudinal end to a free end, and further including the step of folding each of said loop projections back upon itself, and securing said free ends to associated ones of said pieces to form rod loops.

12. A method as in claim 11, wherein said folding and free end securing steps are performed prior to said step of placing said pieces in overlying relation.

\* \* \* \* \*